Jan. 11, 1944.	H. A. FINK	2,339,065
SORTING MACHINE
Filed April 14, 1942	3 Sheets-Sheet 1
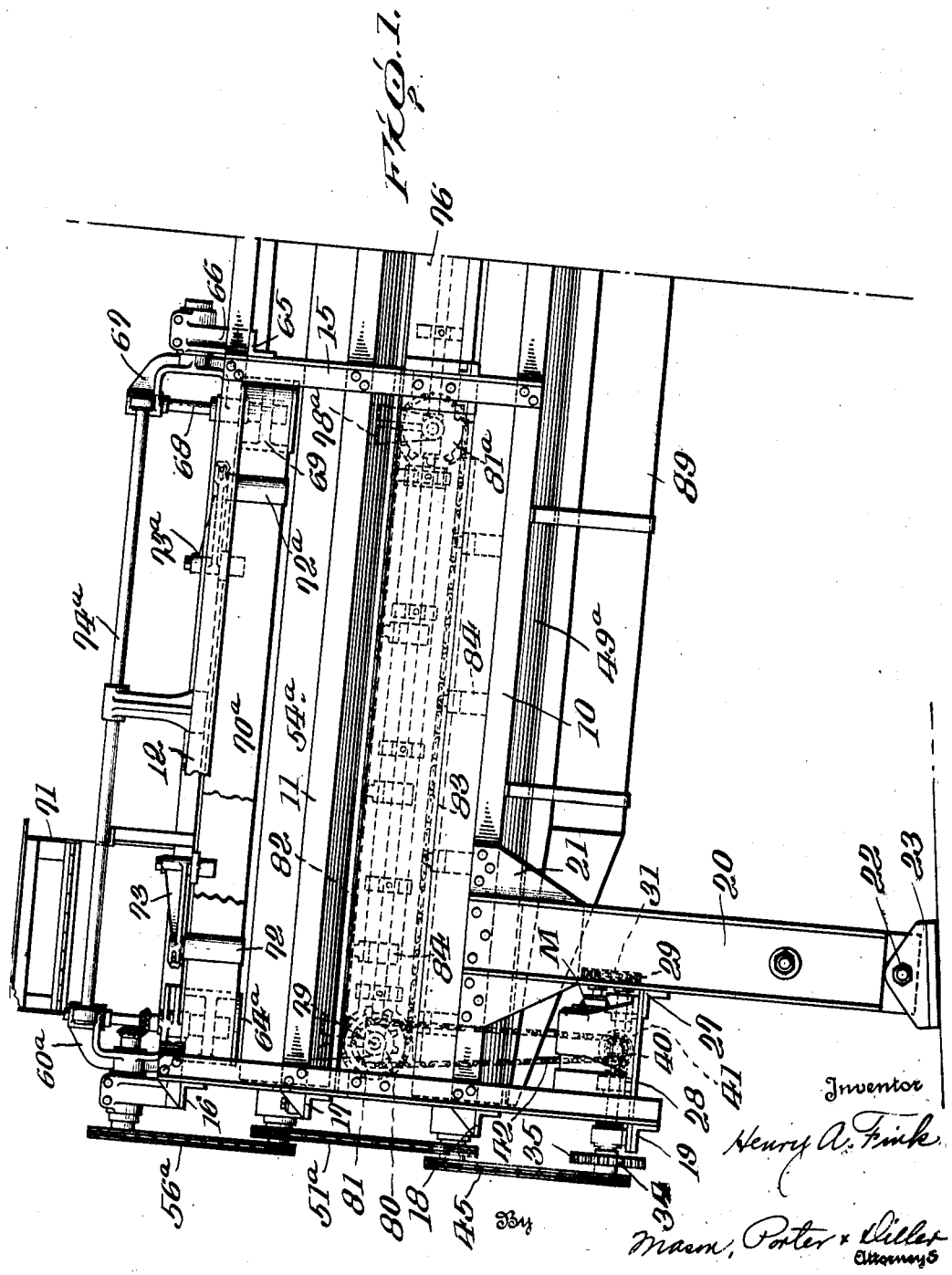

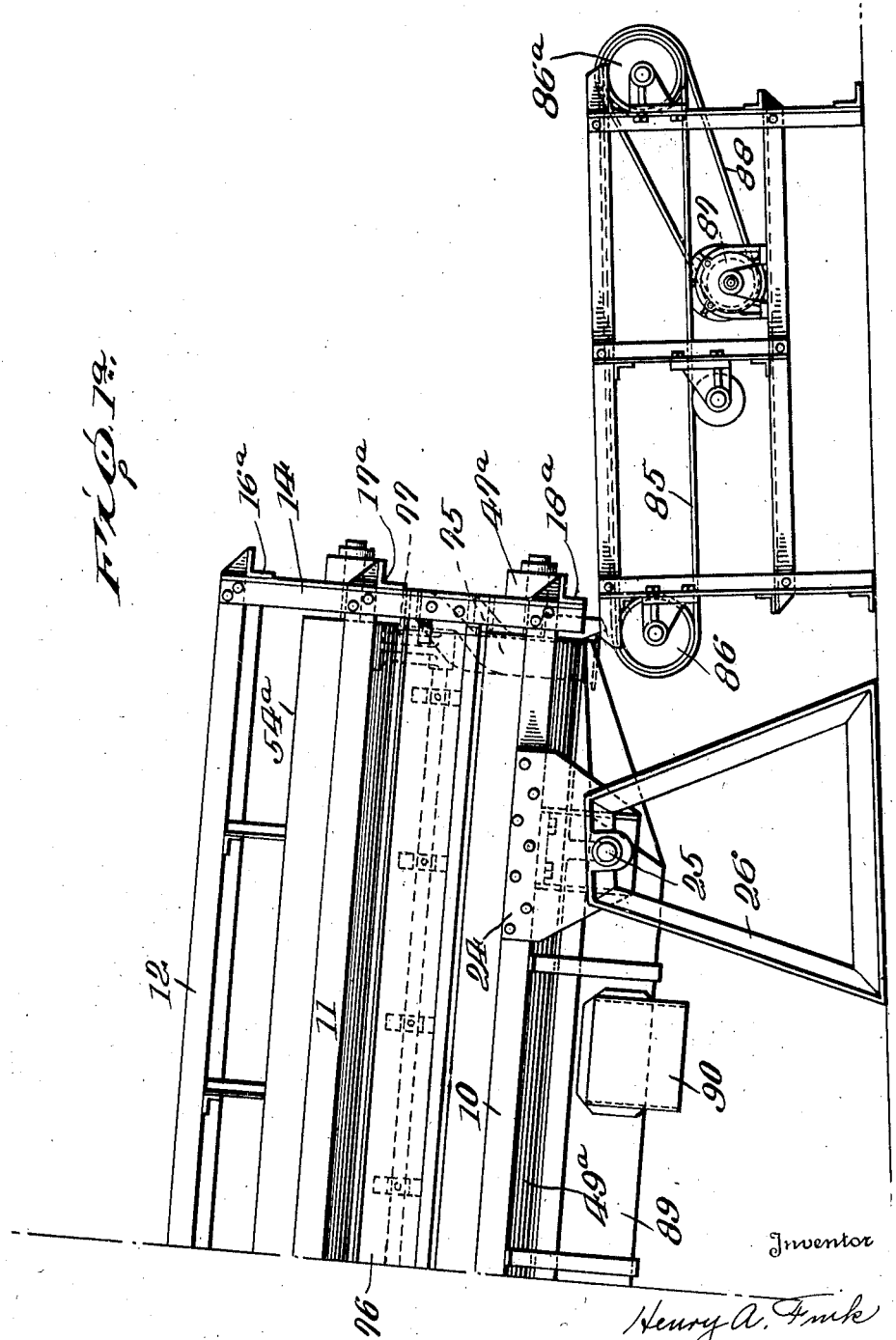

Jan. 11, 1944.   H. A. FINK   2,339,065
SORTING MACHINE
Filed April 14, 1942   3 Sheets-Sheet 3
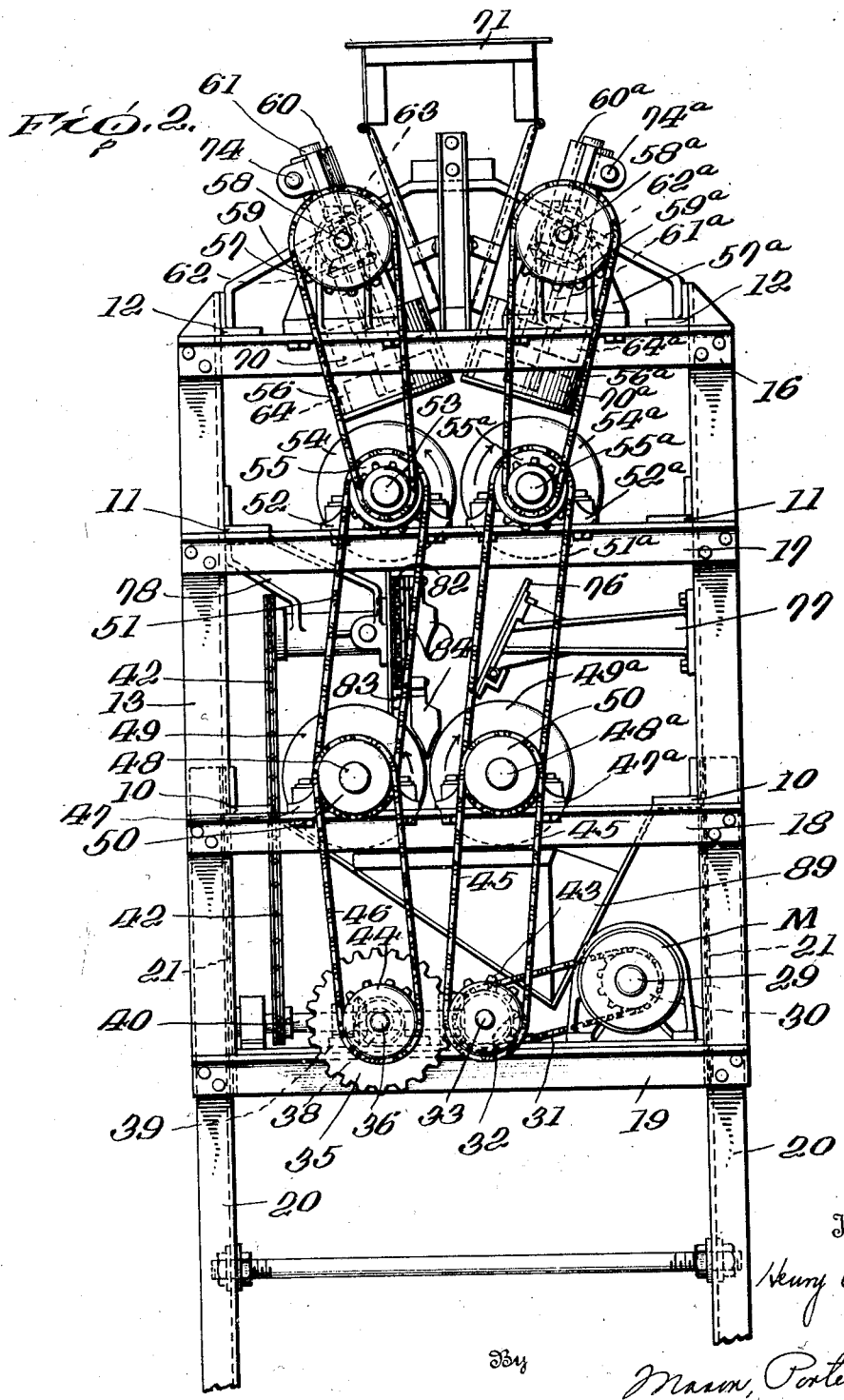
Inventor
Henry A. Fink Patented Jan. 11, 1944

2,339,065

UNITED STATES PATENT OFFICE 2,339,065

SORTING MACHINE

Henry A. Fink, Pelham Manor, N. Y., assignor to Continental Can Company, Inc., New York, N. Y., a corporation of New York Application April 14, 1942, Serial No. 438,956

4 Claims. (Cl. 209—107)

The present invention relates to new and useful improvements in a machine for sorting various articles as to thickness, and more particularly to improvements in a machine for grading or sizing inserts employed in closure members for containers.

In various types of containers, such as bottles, jars, or the like, sealing is effected by means of a closure member which includes an outer cap or shell and an insert or liner disposed within the shell and contacting with the lip of the container around the opening therein. These liners or inserts are generally in the form of discs and may be made of cork or other suitable material. In order to obtain a proper seal for the containers, these discs must be of the proper thickness and accordingly, one of the principal objects of the present invention is to provide a machine for grading or sizing the discs so that those which are too thick or too thin are discarded during passage through the machine.

Another object of the invention is to provide a machine of the above type wherein the discs are delivered in bulk to the machine at the charging end thereof and wherein discs of improper thickness are discarded during passage through the machine while discs of the proper thickness are passed through the machine to a sorting table where broken pieces may be rejected.

A further object of the invention is to provide a machine of the above type wherein the discs, after being delivered in bulk to the charging end of the machine, are distributed and separated over large areas during passage through the machine in order to facilitate sizing and grading thereof.

A still further object of the invention is to provide a machine of the above type including upper and lower pairs of cooperating sizing rollers with the upper pair of rollers permitting passage therethrough of discs of proper size and discs which are too thin and with the lower pair of rollers permitting the passage therethrough of discs which are too thin so that discs of proper thickness are passed along the lower rollers to the sorting table.

A still further object of the invention is to provide a machine of the above type wherein the discs are distributed and separated along the rollers during passage through the machine, this being accomplished by differential speeds of the rollers as well as mechanical separating means.

The above and other objects of the invention will in part be obvious and will be hereinafter more fully pointed out.

In the accompanying drawings:

Figure 1 is a side elevation showing the front or charging end of the machine.

Figure 1a is a continuation of Figure 1 in elevation showing the rear or discharge end of the machine and the sorting table.

Figure 2 is a slightly enlarged end elevation of the front of the machine.

Referring more in detail to the accompanying drawings, the machine includes a skeleton framework resting on a floor or other suitable platform and being constructed so as to support the operating parts of the machine. This framework includes vertically and horizontally spaced pairs of parallel angle beams 10, 11, 12 and each angle beam includes parallel vertical portions and horizontal portions extending inwardly toward one another in each pair of beams. The vertical portions of the beams 10, 11, 12 are connected to a pair of front vertical members 13 which are in the form of right angled beams. The rear ends of the longitudinal beams 10, 11, 12 are similarly secured to a pair of rear vertically extending angle beams 14, and the longitudinal beams are secured intermediate the ends thereof to pairs of similar angle beams 15. In order to further strengthen the framework and to provide supports for the various operating parts of the machine, transverse angle beams 16, 17, 18, and 19 have the substantially vertical portions secured to the front vertical beams 13 with the horizontal portions of the beams 16, 17, and 18 disposed below the horizontal portions of the longitudinal beams 12, 11, 10. Similar transverse beams 16a, 17a, 18a are secured across the rear vertical beams 14. It is to be noted that the front vertical beams 13 extend below the lower longitudinal beams 10 and the transverse beam 19 is secured at the lower ends thereof.

The entire framework is supported so as to incline downwardly from the charging end of the machine to the discharge end thereof. For this purpose, the front end of the machine is supported by legs 20 having brackets 21 at the upper ends thereof. These brackets 21 are secured to the vertical portions of the lower longitudinal beams 10. The bottom ends of the legs 20 are pivoted, as at 22, to shoes 23 which rest on the floor or other supporting surface. At the rear end of the machine, brace plates 24 are secured to the vertical portions of the beams 10 and are pivotally connected, as at 25, to substantially triangular supporting members 26 which are shorter than the legs 20 so that the machine is given the desired downward inclination from the front end to the discharging end. A transverse angle beam 27 is secured across the legs 20 and the horizontal portion of this beam 27 together with the horizontal portion of the transverse beam 19 provide ledges for holding a supporting platform 28 on which a motor M is mounted at one side thereof with the driving shaft 29 extending rearwardly and longitudinally of the machine.

The motor shaft 29 carries a sprocket wheel 30 which is connected by a chain 31 to a sprocket wheel 32 mounted on a shaft 33 which also extends longitudinally of the machine and which carries a relatively small gear wheel 34 adjacent the opposite end thereof. This shaft 33 is mounted in suitable bearings on the platform 28. The gear wheel 34 meshes with a larger gear wheel 35 which is carried by a shaft 36 having a bevel gear 38 at the inner end thereof meshing with a bevel gear 39 at the end of a shaft 40 extending transversely of the machine and mounted in suitable bearings on the platform 28. This shaft 40 carries a sprocket 41 over which a chain 42 is trained. Outside of the meshing gears 34, 35, there are sprocket wheels 43, 44 carried by the adjacent ends of the shafts 33, 36, respectively. Chains 45 and 46 are trained over the sprocket wheels 43, 44, respectively.

The transverse beams 18, 18a each carry a pair of spaced bearings 47, 47a and a shaft 48 is journalled in the bearings 47 while a shaft 48a is journalled in the bearings 47a. The shafts are parallel and extend longitudinally of the machine and are also inclined with the inclination of the machine. The shaft 48 carries roller 49 and the shaft 48a carries a roller 49a. These rollers cooperate with one another in a manner to be hereinafter described to permit the passage therebetween of discs which are too thin. The passage between the rollers 49, 49a is disposed at one side of the vertical center line of the machine. At the forward end of the shafts 48, 48a there are a pair of longitudinally spaced sprocket wheels 50, 50a, the outer sprocket wheel 50 having the chain 46 trained thereover and the outer sprocket wheel 50a having the chain 45 trained thereover. The inner pairs of sprocket wheels 50, 50a have chains 51, 51a, respectively, trained thereon.

The transverse beams 17, 17a also carry pairs of bearings 52, 52a in which shafts 53, 53a are journalled. These shafts also extend longitudinally of the framework and are inclined with the framework. The shaft 53 carries a roller 54 and the shaft 53a carries a roller 54a. These rollers cooperate with one another to afford a passage therebetween which is located substantially on the vertical center line of the machine. The front ends of the shafts 53, 53a extend forwardly of the bearings and carry inner and outer sprocket wheels 55, 55a. The chains 51, 51a are trained over the inner sprocket wheels 55, 55a, respectively, and chains 56, 56a are trained around the outer sprocket wheels.

Laterally spaced brackets 57, 57a are secured to the horizontal portion of the transverse beam 16 and these brackets carry short longitudinally extending shafts 58, 58a, respectively. The front ends of the shafts 58, 58a carry sprocket wheels 59, 59a, respectively, over which the chains 56, 56a are trained. Bracket arms 60, 60a extend rearwardly and support inclined shafts 61, 61a and these shafts have bevel gears 62, 62a meshing with bevel gears 63, 63a, respectively, on the shafts 58, 58a. Thus, rotation of the shafts 58, 58a by means of the chains 56, 56a effect rotation of the inclined shafts 61, 61a which carry pulleys 64, 64a at the bottom ends thereof. A transverse beam 65 is connected to the vertical beams 15 and serves to support spaced brackets 66 which are similar to the brackets 57, 57a. Bracket arms 67 are supported by the bracket members 66 and carry similarly inclined shafts 68 having pulleys 69 at the bottom ends thereof. The front bracket arms 60, 60a and the rear bracket arms 67 may be adjusted in the supporting bracket members so as to alter inclination of the shafts carried by the arms.

A belt 70 is trained over the pulley 64 and the corresponding pulley at the rear end of the machine and a similar belt 70a is trained over the pulley 64a and the corresponding pulley toward the rear of the machine. These belts, as illustrated in Figure 1, extend approximately halfway through the machine and provide a V-shaped recess at the center of the machine. The discs or other articles to be graded are delivered in bulk through a hopper 71 to the recess between the belts. A space is provided between the lower ends of the belts so as to permit the discs to pass therethrough onto the sizing rollers 54, 54a. Idler pulleys may be disposed between the ends of the belts and each belt has a conventional form of tightener including a pulley 72 carried by a pivoted bracket arm 73. The front and rear bracket arms carry strengthening rods 74, 74a.

The inclined sides of the hopper 71 serve to direct the discs in bulk to the adjacent surfaces of the belts which define the V-shaped recess. The adjacent surfaces of the belts travel toward the rear of the machine so as to tend to spread the discs over the entire surface of the sizing rollers 54, 54a. The ratio between the small gear 34 and the large gear 35 is such as to drive the roller 49a, the roller 54a and the belt 70a at approximately twice the speed of the rollers 49, 54 and the belt 70. In this manner, the increased speed of the belt 70a serves to further separate and scatter the discs as they are delivered in bulk from the hopper. All of the discs are thus passed to the space between the upper sizing rollers 54, 54a and the inclination thereof and the increased speed of the roller 54a serve to further separate the discs. The passage between the adjacent surfaces of the rollers 54, 54a is of a size to permit discs of proper size and also discs which are too thin to pass therebetween. However, discs which are too thick are carried along the rollers and discharged into a chute 75 at the rear end of the machine.

Below the rollers 54, 54a, there is provided a plate 76 which extends longitudinally of the machine and which has the lower end thereof disposed immediately adjacent the surface of the roller 49a. This plate 76 is supported by suitable bracket members 77 which are secured to the framework. Since the passage between the lower sizing rollers 49, 49a, is disposed at one side of the vertical center line of the machine, the plate 76 serves to direct discs falling from the passage between the rollers 54, 54a to the space between the cooperating surfaces of the lower rollers 49, 49a.

In order to further separate the discs over the surfaces of the lower sizing rollers 49, 49a, a mechanical separating mechanism is provided and this will be now described. A bracket member 78 is secured to the transverse beam 17 and supports a transversely extending shaft 79. The outer end of the shaft is provided with a sprocket wheel 80 over which the chain 42 is trained and the inner end of the shaft 79 is provided with a larger sprocket 81 over which a chain 82 is trained. The chain 82 extends longitudinally of the machine and is trained over the sprocket 81a intermediate the ends of the framework. The sprocket 81a is supported by a bracket member 78a. The chain 42 serves to drive the shaft 79 and as a result thereof, the chain 82 is driven with the lower run moving toward the rear of the machine. A longitudinal support 83 extends beneath the lower run of the chain 82 so as to support the chain in proper position over the roller 49. The chain 82 carries a plurality of separator or distributing elements 84 which are pivotally connected thereto. The distributing elements 84 are provided with pointed lower ends which fit within a portion of the adjacent surfaces of the rollers 49, 49a, and tend to separate and distribute discs which are directed between these rollers. The movement of the chain 82 thus serves to draw the elements 84 along between the rollers 49, 49a, for the purpose of spreading the discs.

The space or passage between the rollers 49, 49a is such as to permit only discs which are too thin to pass therebetween and the discs of proper size are directed along the rollers and delivered to the sorting table which consists of a travelling belt 85 passing over pulleys 86, 86a, the latter pulley being driven from a motor 87 by means of a chain or belt 88. From this sorting table, broken discs may be discarded by the operator. The discs passing between the rollers 49, 49a, are delivered into a collecting tray 89 provided with a gate 90 from which the rejected discs may be withdrawn.

The rollers 54, 54a rotate in opposite directions and upwardly and away from the passage therebetween, as do the rollers 49, 49a. As previously pointed out, the ratio between the meshing gears 34 and 35 is such as to drive the rollers 49a, 54a at approximately twice the speed of the rollers 49, 54, respectively. Thus, the rollers 49, 54 may be rotated at approximately 70 R. P. M. and the rollers 49a, 54a may be rotated at approximately 140 R. P. M. As the discs are delivered to the V-shaped recess between the belts 70, 70a, the differential speed of travel of these belts serves to separate and distribute the discs as they are directed toward the passage between the rollers 54, 54a. The increased speed of the roller 54a serves to separate the discs and to also properly position the discs for presentation to the sizing passage between the rollers. Discs of proper size and also those which are too thin are permitted to pass through the passage between the rollers 54, 54a while discs which are too thick are carried along the downwardly inclined rollers and discharged through the chute 75. The discs which pass through the rollers 54, 54a fall between the rollers 49, 49a which are spaced so as to prevent proper sized discs from passing therebetween. Thus, discs which are too thin are permitted to pass between the rollers and into the collecting tray 89. The plate 76 serves to direct the falling discs to the bight between the rollers 49, 49a and the separator elements 84 travelling along the bight between the rollers and rearwardly of the machine tend to further separate and distribute the discs so as to assure the passage therethrough of discs which are too thin. The differential speed of the rollers also cooperates to aid in this separation and distribution of the discs.

While one form of the invention has been shown for purposes of illustration, it is to be clearly understood that various changes in the details of construction and arrangement of parts may be made without distinguishing from the scope of the invention as set forth in the appended claims.

I claim:

1. A machine for sorting discs and similar articles with respect to thickness, comprising a plurality of vertically spaced pairs of cooperating sizing rollers inclined downwardly from the front end of the machine to the rear end thereof, a hopper arranged adjacent the front end of the machine for delivering articles in bulk, means for separating and distributing the articles delivered from the hopper before the articles are passed to the upper pair of rollers, the said upper pair of rollers being spaced apart a distance sufficient to only permit passage therebetween of articles of proper size and articles which are too thin whereby articles which are too thick are maintained thereon and discharged at the lower rear ends thereof and the lower pair of rollers being spaced apart to only permit passage therebetween of articles which are too thin whereby articles of proper size are maintained thereon and discharged at the lower rear ends thereof, means for rotating the rollers of each pair in opposite directions upwardly away from the spaces therebetween whereby to further assist in separation and distribution of the articles, and means for mechanically separating and spreading the articles on said lower pair of rollers and including elements traveling in contact with the adjacent surfaces of the said lower pair of rollers from the front end toward the rear end of the machine, said last named means comprising an endless chain having a flight disposed over the bight between said lower pair of rolls, and separator and distributor elements freely suspended from said chain in said bight.

2. A machine for sorting discs and similar articles with respect to thickness, comprising a plurality of vertically spaced pairs of cooperating sizing rollers inclined downwardly from the front end of the machine to the rear end thereof, a hopper arranged adjacent the front end of the machine for delivering articles in bulk, a pair of flat endless belts defining a V-shaped recess of uniform width throughout its length below said hopper and traveling in the direction of the rear end of the machine for receiving articles from the hopper and tending to separate and distribute the articles prior to their passage through the recess to the upper pair of rollers, the said upper pair of rollers being spaced apart a distance sufficient to only permit passage therebetween of articles of proper size and articles which are too thin whereby articles which are too thick are maintained thereon and discharged at the lower rear ends thereof and the lower pair of rollers being spaced apart to only permit passage therebetween of articles which are too thin whereby articles of proper size are maintained thereon and discharged at the lower rear ends thereof, and means for rotating the rollers of each pair in opposite directions upwardly away from the spaces therebetween whereby to further assist in separation and distribution of the articles.

3. A machine for sorting discs and similar articles as to thickness, comprising a plurality of vertically spaced pairs of cooperating sizing rollers inclined downwardly from the front end of the machine to the rear end thereof, a hopper arranged adjacent the front end of the machine for delivering articles in bulk, the upper pair of rollers being spaced apart a distance sufficient to only permit passage therebetween of articles of proper size and articles which are too thin whereby articles which are too thick are maintained thereon and discharged at the lower rear ends thereof and the lower pair of rollers being spaced apart to only permit passage therebetween of articles which are too thin whereby articles of proper size are maintained thereon and discharged at the lower rear ends thereof, a chain traveling longitudinally of the machine and disposed over one of said lower rollers with the lower run of the chain traveling from the front toward the rear end of the machine, distributing elements shaped to fit in the space between the said lower pair of rollers and pivotally connected to and movable with the chain whereby to spread and distribute the articles on the lower pair of rollers, and means for rotating the rollers of each pair in opposite directions upwardly away from the spaces therebetween whereby to further assist in separation and distribution of the articles.

4. A machine for sorting discs and similar articles with respect to thickness, comprising a plurality of vertically spaced pairs of cooperating sizing rollers inclined downwardly from the front end of the machine to the rear end thereof, a hopper arranged adjacent the front end of the machine for delivering articles in bulk, the said upper pair of rollers being spaced apart a distance sufficient to only permit passage therebetween of articles of proper size and articles which are too thin whereby articles which are too thick are maintained thereon and discharged at the lower rear ends thereof and the lower pair of rollers being spaced apart to only permit passage therebetween of articles which are too thin whereby articles of proper size are maintained thereon and discharged at the lower rear ends thereof, means for rotating the rollers of each pair in opposite directions upwardly away from the spaces therebetween whereby to further assist in separation and distribution of the articles, means for mechanically separating and spreading the articles on said lower pair of rollers and including elements traveling in drag contact with and along the adjacent surfaces of the said lower pair of rollers from the front end toward the rear end of the machine, said lower rollers being disposed with the space therebetween to one side of and out of vertical alignment with the space between said upper rollers, and a deflector plate for deflecting discs falling between said upper rolls laterally against said separator and distributor elements and into the bight between said lower rollers.

HENRY A. FINK.